United States Patent [19]

Arbit

[11] 4,255,531
[45] Mar. 10, 1981

[54] BLENDS WITH POLY(P-METHYLSTYRENE)

[75] Inventor: Harold A. Arbit, Highland Park, N.J.

[73] Assignee: Mobil Oil Corporation, Fairfax, Va.

[21] Appl. No.: 101,655

[22] Filed: Dec. 10, 1979

Related U.S. Application Data

[63] Continuation-in-part of Ser. No. 69,481, Aug. 24, 1979, abandoned, which is a continuation-in-part of Ser. No. 971,178, Dec. 20, 1978, abandoned.

[51] Int. Cl.³ .............................................. C08L 0/00
[52] U.S. Cl. .................................. 525/237; 525/221; 525/222; 525/227; 525/240
[58] Field of Search ............... 525/221, 222, 227, 237, 525/240

[56] References Cited

U.S. PATENT DOCUMENTS

| | | | |
|---|---|---|---|
| 3,092,891 | 6/1963 | Baratti | 28/82 |
| 3,173,163 | 3/1975 | Cramton | 15/159 |
| 3,666,834 | 5/1972 | Bullard | 260/897 |

*Primary Examiner*—Carman J. Seccuro
*Attorney, Agent, or Firm*—Charles A. Huggett; Hastings S. Trigg

[57] ABSTRACT

There is provided a blend of poly(p-methylstyrene) with small amounts of poly ($C_2$–$C_4$) olefin, olefin copolymer or SBR. The blend can be formed into shaped articles, such as food containers, which can be crosslinked by irradiation at low doses. Such articles are resistant to microwave oven conditions.

7 Claims, No Drawings

BLENDS WITH POLY(P-METHYLSTYRENE)

CROSS-REFERENCE TO RELATED APPLICATIONS

This application is a continuation-in-part of copending application Serial No. 069,481, filed August 24, 1979, which is a continuation-in-part of copending application Serial No. 971,178, filed December 20, 1978, both now abandoned.

BACKGROUND OF THE INVENTION

1. Field of the Invention

This invention is concerned with blends of poly(p-methylstyrene) with low molecular weight polyolefins and olefin copolymers which can be crosslinked by ionizing radiation at low dosage levels.

2. Description of the Prior Art

Insofar as is now known, the blends of this invention have not been proposed. Surprisingly, corresponding blends with polystyrene are not crosslinked by radiation.

SUMMARY OF THE INVENTION

This invention provides blends of poly(p-methylstyrene) with between about 0.1 weight percent and about 10 weight percent low molecular weight poly($C_2$–$C_4$) monoolefin, olefin copolymers, or SBR.

DESCRIPTION OF SPECIFIC EMBODIMENTS

The monomer used in preparing the homopolymer or copolymers from which the blends of this invention are made is p-methylstyrene. It is within the contemplation of this invention to use mixtures of methylstyrene rich in p-methylstyrene. Such mixtures contain at least 95 weight percent, preferably 97–99 weight percent, p-methylstyrene and less than 0.1 weight percent o-methylstyrene with the balance being m-methylstyrene. A typical mixture contains, by weight, about 95 percent p-methylstyrene, about 5 percent m-methylstyrene, and about 0.5 percent o-methylstyrene. The mixtures are obtained by catalytic dehydrogenation of the mixtures of ethylmethyl benzene isomers described in U.S. Pat. No. 4,086,287 to which reference is made.

The polymers contemplated herein are p-methylstyrene or p-methylstyrene-rich isomer mixture homopolymer or their copolymers containing between about 10 and about 1 weight percent conjugated diene, such as butadiene and isoprene. The polymerization reaction is carried out by using methods and catalysts well known in the art for polymerizing styrene. The reaction can be carried out in solution, bulk, suspension, or emulsion.

In accordance with this invention, the material that is blended with the poly(p-methylstyrene) is a low molecular weight poly($C_2$–$C_4$) monoolefin, olefin copolymers, or SBR. In general, molecular weights will be in the order of between about 2,000 and about 20,000 or higher. The polymers utilized herein include homopolymers of ethylene, propylene, and butene-1 and copolymers thereof, such as ethylene-propylene, butene-propylene, or butene-ethylene. Also utilizable are copolymers of an olefin and an unsaturated monomer copolymerizable therewith, such as ethylene-acrylate copolymers, e.g., ethylene-acrylic acid and ethylene-ethyl acrylate, or ethylene-vinyl acetate. Such polyolefins or olefin copolymers can be prepared by any of the processes well known in the art, usually under free radical conditions. A preferred material is lower molecular weight polyethylene, which is described in U.S. Pat. Nos., such as Nos. 2,402,137; 2,504,400; and 2,683,141, to which reference is made. Low molecular weight polyolefins, particularly polyethylene, are available commercially.

Small amounts of low molecular weight polyolefins or copolymers are effective to induce crosslinking by radiation at low dosage level. Generally, between about 0.1 weight percent and about 10 weight percent, preferably between about 0.5 weight percent and about 5 weight percent, will be used. Blending can be effected in a variety of ways, such as in solution in aromatic solvents, e.g., toluene, from which sheets or films can be cast. The blend components can be mixed in a tumbling agitator and fed into an extruder to produce sheets, films, or foamed sheets, or they can be fed separately to an extruder for extruder blending.

The blends of this invention can be formed into sheets, films, or foamed sheets and thermoformed to produce shaped articles, such as food containers. After being irradiated, such shaped articles are heat resistant and are not affected by fatty foods under microwave oven conditions.

Ionizing radiation is inclusive of extremely short-wave length, high energetic, penetrating rays such as gamma rays, X-rays, and subatomic particles accelerated in cyclotrons, betatrons, synchrotrons, and linear accelerators. The effect of irradiating the shaped articles is to crosslink the poly(p-methylstyrene) blend. The irradiation dose can be between about 20 megarads and about 45 megarads, whereas poly(p-methylstyrene) requires between about 50 megarads and about 60 megarads. Similar blends using polystyrene are not crosslinked at low dosages.

EXAMPLE 1

Poly(p-methylstyrene) (PPMS), containing 3% meta isomer and 0.1% ortho isomer, was dissolved in toluene at a concentration of 25 weight percent. Then, one weight percent low molecular weight, finely divided polyethylene (particle size 12 microns average) based on solid weight was added and dissolved. The polyethylene had a molecular weight of about 5,000–6,000 and density of 0.99 g./cc. Films were cast onto a smooth surface coated with polyethylene terephthalate and drawn down and dried to obtain a dried film thickness of about 2 mils. Film samples were irradiated by electron beam at various megarad (M Rads) doses. For each dosage level, crosslinking was determined by measuring solubility of the irradiated films in toluene at room temperature overnight. Any insoluble gel thus formed was filtered and dried to constant weight at 115° C. For comparison, films of polystyrene (PS) containing one weight percent of the polyethylene used above were irradiated and tested for gel content. Pertinent data are set forth in Table I.

TABLE I

| Dose, M Rads | Gel. Content, % 1% Polyethylene in | |
|---|---|---|
| | PPMS | PS |
| 0 | 0 | 0 |
| 2 | 0 | 0 |
| 12 | 1.3 | 0 |
| 22 | 58.9 | 0 |
| 42 | 90.4 | 0 |
| 44 | 96.5 | 0 |

From the data in Table I, it will be noted that at doses between about 20 and about 45 M Rads substantial crosslinking of the blend of PPMS and polyethylene took place as measured by gelation, whereas PS blends did not crosslink. With PPMS alone (unblended), doses in the order of 50–60 M Rads were required. Thus, using the blends of this invention considerable energy savings are effected.

EXAMPLE 2

The run of Example 1 was repeated, except that the polyethylene used was one having a molecular weight of about 18,000 and a density of 0.924 g./cc. Pertinent data for irradiation of 2 mil films of the 1% blend in PPMS are set forth in Table II.

TABLE II

| Dose, M Rads | Gel Content, % 1% Polyethylene in | |
|---|---|---|
| | PPMS | PS |
| 0 | 0 | 0 |
| 10–12 | 0 | 0 |
| 40–42 | 93.1 | 0 |

EXAMPLES 3 THROUGH 7

A series of blends with PPMS (Example 1) was prepared each containing one weight percent of a different polyolefin or olefin copolymer and films were made therefrom. Each film was irradiated by electron beam at various M Rad dosage levels. As described in Example 1, the amount of crosslinking was determined at each dosage level. Pertinent data and results are set forth in Table III.

TABLE III

| EX. NO. | ADDITIVE | % ETHYLENE IN ADDITIVE | % GEL AT RADIATION LEVELS, M RADS | | | | |
|---|---|---|---|---|---|---|---|
| | | | 0 | 2 | 12 | 24 | 44 |
| 3. | Ethylene Acrylic Acid, Copolymer | 92 | 0 | .19 | .16 | 9.2 | 42.9 |
| 4. | Ethylene Vinyl Acetate, Copymer | 92 | 0 | 0 | .05 | 13.1 | 30.1 |
| 5. | Polypropylene | 0 | 0 | 0 | .31 | 25.2 | 47.9 |
| | Styrene Butadiene Rubber* | 0 | 0 | 3.1 | 6.5 | 37.3 | 61.4 |
| 7. | Ethylene Propylene Rubber | 30 | 0 | 3.3 | 4.2 | 47.3 | 57.9 |

*about 30% styrene

Although the present invention has been described with preferred embodiments, it is to be understood that modifications and variations may be resorted to, without departing from the spirit and scope of this invention, as those skilled in the art will readily understand. Such variations and modifications are considered to be within the purview and scope of the appended claims.

What is claimed is:

1. A blend of poly(p-methylstyrene) with between about 0.1 weight percent and about 10 weight percent low molecular weight poly ($C_2$–$C_4$) monoolefin, monoolefin copolymer, or styrene-butadiene rubber.

2. The blend of claim 1 containing between about 0.5 weight percent and about 5 weight percent of said poly ($C_2$–$C_4$) monoolefin, monoolefin copolymer, or styrene-butadiene rubber.

3. The blend of claim 2, wherein said poly ($C_2$–$C_4$) monoolefin is polyethylene having a molecular weight of about 5,000–6,000.

4. The blend of claim 2, wherein said poly ($C_2$–$C_4$) monoolefin is polyethylene having a molecular weight of about 18,000.

5. The blend of claim 2, containing between about 0.5 weight percent and about 5 weight percent styrene-butadiene rubber.

6. The blend of claim 2, wherein said poly ($C_2$–$C_4$) olefin is polypropylene.

7. The blend of claim 2, wherein said monoolefin copolymer is ethylene propylene rubber.

* * * * *